(12) United States Patent
Woodall et al.

(10) Patent No.: US 7,701,512 B1
(45) Date of Patent: Apr. 20, 2010

(54) SYSTEM AND METHOD FOR IMPROVED HORIZONTAL AND VERTICAL SYNC PULSE DETECTION AND PROCESSING

(75) Inventors: Neil D. Woodall, Newport Beach, CA (US); Kevin Ng, Scarborough (CA)

(73) Assignee: Pixelworks, Inc., Tualatin, OR (US)

( * ) Notice: Subject to any disclaimer, the term of this patent is extended or adjusted under 35 U.S.C. 154(b) by 1091 days.

(21) Appl. No.: 11/361,812

(22) Filed: Feb. 23, 2006

Related U.S. Application Data

(63) Continuation-in-part of application No. 10/851,521, filed on May 20, 2004, now Pat. No. 7,365,796.

(60) Provisional application No. 60/472,314, filed on May 20, 2003, provisional application No. 60/472,312, filed on May 20, 2003, provisional application No. 60/472,280, filed on May 20, 2003, provisional application No. 60/472,311, filed on May 20, 2003.

(51) Int. Cl.
H04N 5/08 (2006.01)
H04N 5/10 (2006.01)
H03L 7/00 (2006.01)

(52) U.S. Cl. .................. 348/526; 348/531; 348/533; 348/540

(58) Field of Classification Search .......... 348/525, 348/526, 531, 533, 536, 540, 550, 512, 194, 348/521; 386/13, 85
See application file for complete search history.

(56) References Cited

U.S. PATENT DOCUMENTS 3,860,952 A    1/1975   Tallent et al.
4,196,445 A    4/1980   Okada et al.
4,303,939 A *  12/1981  Stephens et al. ............ 348/194
4,443,821 A    4/1984   Kato
4,524,389 A *  6/1985   Isobe et al. .................. 348/725
4,531,154 A *  7/1985   Hallock ....................... 348/510
4,555,734 A *  11/1985  Fukui .............................. 386/3
4,641,180 A    2/1987   Richter
4,675,724 A    6/1987   Wagner
4,814,875 A *  3/1989   Oldershaw .................. 348/521
4,827,341 A *  5/1989   Akimoto et al. ............. 348/526
4,855,815 A    8/1989   Yasuki et al.
4,873,574 A *  10/1989  Darby .......................... 348/193
4,945,413 A *  7/1990   Merval et al. ................ 348/542
4,987,491 A *  1/1991   Kaite et al. .................. 348/497
5,097,321 A    3/1992   Stern et al.
5,115,454 A *  5/1992   Kucar .......................... 375/321
5,121,203 A    6/1992   Citta
5,121,207 A    6/1992   Herrmann
5,134,467 A    7/1992   Kim (Continued)

FOREIGN PATENT DOCUMENTS

EP    0449501 A    10/1991
EP    0549375 A    6/1993

*Primary Examiner*—Victor Kostak
(74) *Attorney, Agent, or Firm*—Marger Johnson & McCollom, P.C.

(57) ABSTRACT

We describe and claim a system and method for horizontal and vertical sync detection and processing. A method comprises detecting synchronization information within a video signal, estimating stability of the video signal according to the detected synchronization information, and generating one or more synchronization signals according to the detected synchronization information and the estimated stability of the video signal.

38 Claims, 6 Drawing Sheets

U.S. PATENT DOCUMENTS

| | | | |
|---|---|---|---|
| 5,142,377 A | 8/1992 | Moriyama et al. | |
| 5,231,478 A | 7/1993 | Fairhurst | |
| 5,260,839 A | 11/1993 | Matsuta et al. | |
| 5,294,979 A * | 3/1994 | Patel et al. | 348/624 |
| 5,345,276 A | 9/1994 | Hong | |
| 5,355,176 A | 10/1994 | Inagaki et al. | |
| 5,359,366 A | 10/1994 | Ubukata et al. | |
| 5,367,338 A | 11/1994 | Rothermel et al. | |
| 5,394,193 A | 2/1995 | Kim | |
| 5,418,818 A | 5/1995 | Marchetto et al. | |
| 5,451,999 A * | 9/1995 | Wesolowski | 348/180 |
| 5,452,288 A * | 9/1995 | Rahuel et al. | 370/203 |
| 5,506,932 A | 4/1996 | Holmes et al. | |
| 5,525,984 A | 6/1996 | Bunker | |
| 5,526,129 A | 6/1996 | Ko | |
| 5,600,379 A | 2/1997 | Wagner | |
| 5,619,275 A * | 4/1997 | Tults | 348/526 |
| 5,686,972 A | 11/1997 | Kim | |
| 5,710,729 A | 1/1998 | Feste et al. | |
| 5,748,842 A | 5/1998 | Holmes et al. | |
| 5,886,999 A * | 3/1999 | Kojima et al. | 714/708 |
| 5,909,255 A | 6/1999 | Hatano | |
| 5,940,138 A | 8/1999 | Lowe | |
| 5,953,071 A | 9/1999 | Van Zon | |
| 5,963,268 A | 10/1999 | Ko | |
| 5,990,978 A | 11/1999 | Kim et al. | |
| 6,052,748 A | 4/2000 | Suominen et al. | |
| 6,173,003 B1 | 1/2001 | Whikehart et al. | |
| 6,175,389 B1 | 1/2001 | Felts, III et al. | |
| 6,208,671 B1 | 3/2001 | Paulos et al. | |
| 6,297,849 B1 | 10/2001 | Stessen et al. | |
| 6,300,985 B1 | 10/2001 | Lowe | |
| 6,462,790 B1 | 10/2002 | Lowe et al. | |
| 6,473,134 B1 * | 10/2002 | Nohara et al. | 348/614 |
| 6,484,316 B1 * | 11/2002 | Lindberg | 725/17 |
| 6,529,248 B1 * | 3/2003 | Tsyrganovich | 348/691 |
| 6,581,164 B1 | 6/2003 | Felts, III et al. | |
| 6,597,404 B1 * | 7/2003 | Moribe et al. | 348/540 |
| 6,614,474 B1 | 9/2003 | Malkin et al. | |
| 6,714,717 B1 | 3/2004 | Lowe et al. | |
| 6,744,472 B1 | 6/2004 | MacInnis et al. | |
| 6,774,954 B1 | 8/2004 | Lee | |
| 6,791,623 B1 * | 9/2004 | Masuda et al. | 348/563 |
| 6,795,001 B2 | 9/2004 | Roza | |
| 6,795,126 B1 | 9/2004 | Lee | |
| 6,804,697 B2 | 10/2004 | Bugeja et al. | |
| 6,882,360 B2 * | 4/2005 | Zeidler | 348/194 |
| 6,956,620 B2 | 10/2005 | Na | |
| 6,958,771 B2 * | 10/2005 | Takeuchi et al. | 348/194 |
| 6,985,174 B1 * | 1/2006 | Thompson et al. | 348/180 |
| 7,023,489 B2 * | 4/2006 | Coste et al. | 348/526 |
| 7,102,692 B1 | 9/2006 | Carisgaard et al. | |
| 7,327,399 B2 * | 2/2008 | O'Connell | 348/465 |
| 7,489,338 B2 * | 2/2009 | Huang et al. | 348/194 |
| 2001/0028409 A1 * | 10/2001 | Watanabe et al. | 348/554 |
| 2003/0052997 A1 * | 3/2003 | Renner et al. | 348/536 |
| 2005/0052576 A1 * | 3/2005 | Johnson | 348/533 |
| 2006/0103760 A1 * | 5/2006 | Johnson et al. | 348/515 |

* cited by examiner

SYSTEM AND METHOD FOR IMPROVED HORIZONTAL AND VERTICAL SYNC PULSE DETECTION AND PROCESSING

REFERENCE TO RELATED APPLICATIONS

This application is a continuation-in-part of application Ser. No. 10/851,521, filed May 20, 2004, now U.S. Pat. No. 7,365,796 which claims priority from U.S. Provisional Application Nos. 60/472,314; 60/472,312; 60/472,280; and 60/472,311, all filed May 20, 2003. We incorporate all of these applications here by reference.

FIELD OF THE INVENTION

This invention relates to video signal processing and, more specifically, to a system and method for detecting and processing horizontal and vertical synchronization signaling.

BACKGROUND OF THE INVENTION

Composite video signals, commonly used in video broadcasts or transmissions, contain image data and synchronization information. The image data typically includes a brightness signal (luminance, luma or Y) and a color signal (chrominance, chroma or C), where the color signal is modulated into a color sub-carrier and added to the brightness signal prior to transmission. The synchronization information includes horizontal sync pulses to define horizontal line-to-line transitions of the image data, and vertical sync pulses to identify field-to-field transitions. Accurate detection and processing of these horizontal and vertical sync pulses allows systems to properly display the image data.

FIG. 1 shows a typical format of composite video signal 10. Referring to FIG. 1, the composite video signal 10 includes a vertical blanking period 14 within fields 12 and 16. The vertical blanking period 14 includes vertical sync pulses 30 to identify a transition between the fields 12 and 16. When the composite video signal 10 is interlaced, the vertical sync pulses 30 may also be used to identify the polarity of field 16, e.g., as either even or odd. Each field 12 and 16 contains horizontal lines of image data 24 separated by corresponding horizontal blanking periods 22. Each horizontal blanking period 22 includes both a horizontal sync pulse 23 to identify a horizontal line transition and a color burst 25 for use in demodulating the color sub-carrier in the horizontal line of image data 24.

Typically, display systems generate synchronization signals from the horizontal and vertical sync pulses 23 and 30 for use in processing and display of the image data 24 within composite video signal 10. Since picture quality depends upon the accuracy of the synchronization signals relative to the composite video signal 10, any corruption of the composite video signal 10 can cause undesirable results when the image data 24 is displayed. For instance, when time-based errors or temporal shifts are present within the composite video signal 10, a rapid phase shift of the synchronization signals is needed to maintain a lock with the composite video signal 10. Under noisy signal conditions, however, detection of the sync pulses 23 and 30 becomes unreliable, and thus correction of synchronization signals may degrade lock with the composite video signal 10. Current display systems generate their synchronization signals optimizing one of the signal locking techniques, to the detriment of the other technique. For instance, display systems that rapidly compensate for time-based errors are susceptible to miscorrecting their synchronization signals during noisy conditions. Conversely, display systems that minimize correction to synchronization signals to reduce correction-errors during noisy signaling conditions, cannot rapidly compensate for time-based errors. Accordingly, a need remains for a system and method for improved horizontal and vertical sync pulse detection and processing.

BRIEF DESCRIPTION OF THE DRAWINGS

The foregoing and other objects, features, and advantages of the invention will become more readily apparent from the following detailed description of an embodiment that proceeds with reference to the following drawings.

DESCRIPTION OF THE INVENTION

Figure 1:
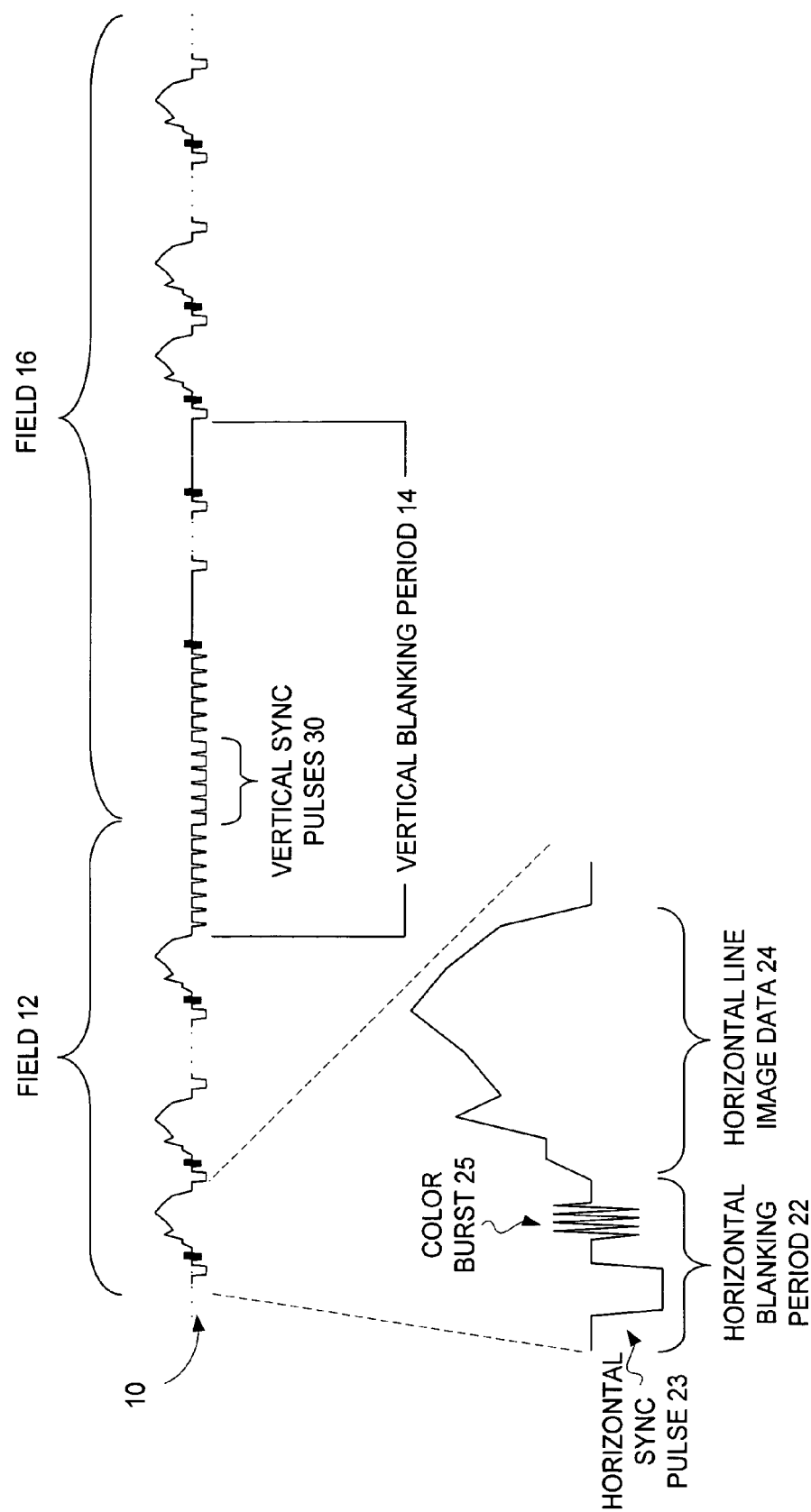
FIG. 1 shows a typical format of composite video signal.
Figure 2:
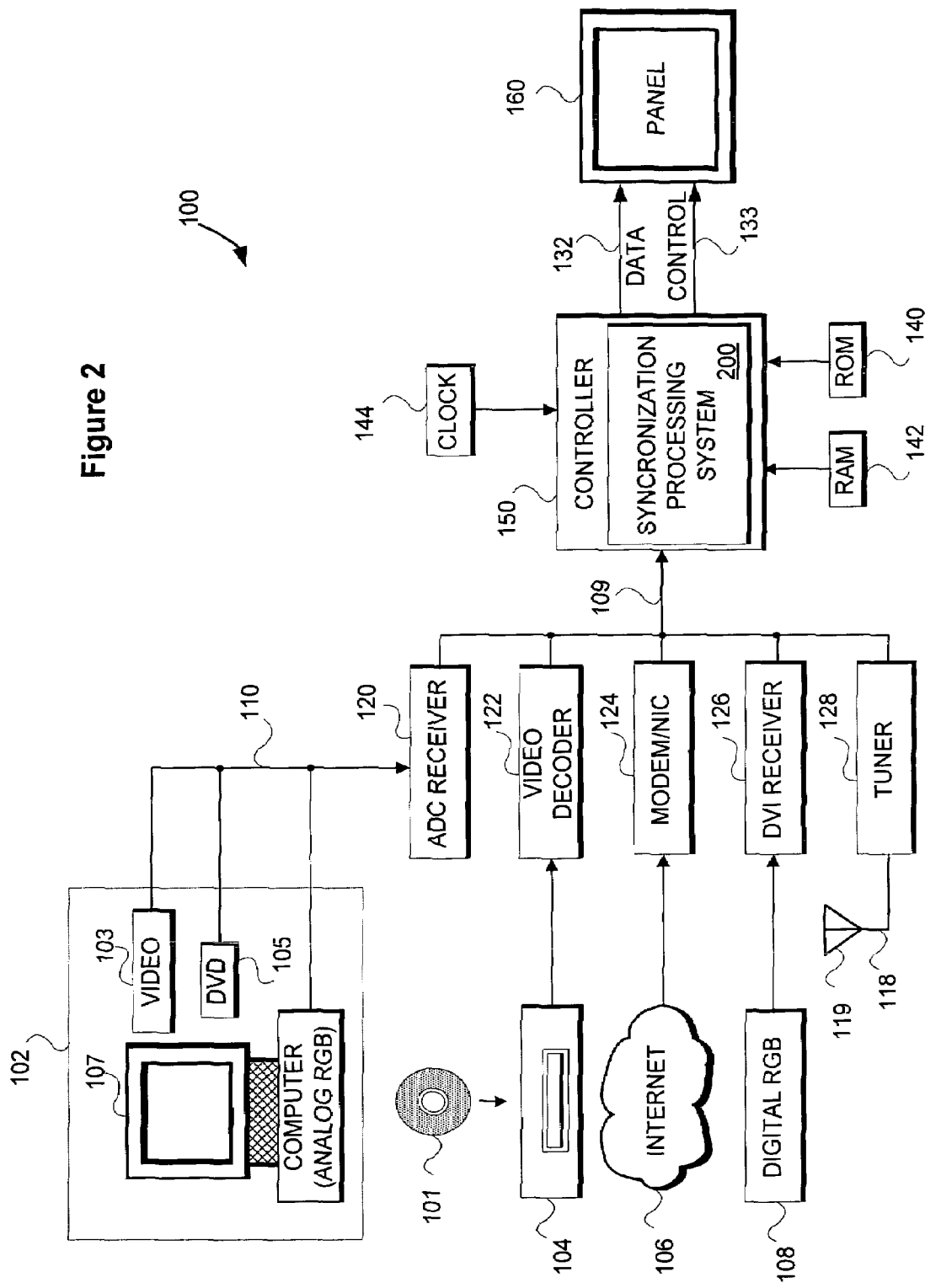
FIG. 2 is a block diagram of a display system.

FIG. 2 is a block diagram of a display system 100. Referring to FIG. 2, the system 100 includes a receiver 120 for receiving an analog image data signal 110, e.g., RGB or $YP_BP_R$ signal, from a source 102. The source 102 may be a personal computer 107, a digital video disk player 105, set top box (STB) 103, or any other device capable of generating the analog or digital image data signal 110. The receiver 120 may be an analog-to-digital converter (ADC) or any other device capable of receiving an analog or digital video signal 109 from the analog image data 110. The receiver 120 converts the analog image data signal 110 into the digital image data 109 and provides it to a controller 150. A person of reasonable skill in the art knows well the design and operation of the source 102 and the receiver 120.

Likewise, a video receiver or decoder 122 may optionally decode an analog video signal 112 from a video source 104 when the input is in the composite or s-video format. The video source 104 may be a video camcorder, tape player, digital video disk (DVD) player, or any other device capable of generating the analog or digital video signal 112. The video source 104 may read (or play) external media 101. In an embodiment, a DVD player 104 plays the DVD 101. In another embodiment, a VHS tape player 104 plays a VHS tape 101. The decoder 122 converts the analog video signal 112 into the digital video signal 109 and provides it to the panel controller 150. The decoder 122 is any device capable of generating digital video signal 109, e.g., in Y/C or CVBS format, from the analog video signal 112. A person of reasonable skill in the art knows well the design and operation of the video source 104 and the video decoder 112.

A modem or network interface card (NIC) 124 receives data 114 from a global computer network 106 such as the Internet®. The data 114 may be in any format capable of transmission over the network 106. In an embodiment, the data 114 is packetized digital data. But the data 114 may also be in an analog form. Likewise, the modem 124 may be a digital or analog modem or any device capable of receiving data 114 from a network 106. The modem 124 provides digital video signal 109 to the panel controller 150. A person of reasonable skill in the art knows well the design and operation of the network 106 and the modem/NIC 124.

A Digital Visual Interface (DVI) or high definition multimedia interface (HDMI) receiver 126 receives digital signals 116 from a digital source 108. In an embodiment, the source 108 provides digital RGB signals 116 to the receiver 126. The receiver 126 provides digital video signal 109 to the panel controller 150. A person of reasonable skill in the art knows well the design and operation of the source 108 and the receiver 126.

A tuner 128 receives a wireless signal 118 transmitted by the antenna 119. The antenna 119 is any device capable of wirelessly transmitting or broadcasting the signal 118 to the tuner 128. In an embodiment, the antenna 119 transmits a television signal 118 to the television tuner 128. The tuner 128 may be any device capable of receiving a signal 118 transmitted wirelessly by any other device, e.g., the antenna 119, and of generating the digital video signal 109 from the wireless signal 118. The tuner 128 provides the digital video signal 109 to the controller 150. A person of reasonable skill in the art knows well the design and operation of the antenna 119 and the tuner 128.

The digital video signal 109 may be in a variety of formats, including composite or component video. Composite video describes a signal in which luminance, chrominance, and synchronization information are multiplexed in the frequency, time, and amplitude domain for single wire transmission. Component video, on the other hand, describes a system in which a color picture is represented by a number of video signals, each of which carries a component of the total video information. In a component video device, the component video signals are processed separately and, ideally, encoding into a composite video signal occurs only once, prior to transmission. The digital video signal 109 may be a stream of digital numbers describing a continuous analog video waveform in either composite or component form. FIG. 2 describes a variety of devices (and manners) in which the digital video signal 109 may be generated from an analog video signal or other sources. A person of reasonable skill in the art should recognize other devices for generating the digital video signal 109 come within the scope of the present invention.

The controller 150 generates image data 132 and control signals 133 by manipulating the digital video signal 109. The panel controller 150 provides the image data 132 and control signals 133 to a panel device 160. The panel 160 includes a pixelated display that has a fixed pixel structure. Examples of pixelated displays are active and passive LCD displays, plasma displays (PDP), field emissive displays (FED), electro-luminescent (EL) displays, micro-mirror technology displays, low temperature polysilicon (LTPS) displays, and the like. A person of reasonable skill in the art should recognize that flat panel 160 may be a television, monitor, projector, personal digital assistant, and other like applications. Although FIG. 2 shows a panel 160, any device capable of displaying digital video signal 109 may be used into system 100.

The controller 150 includes a synchronization processing system 200 to detect and process synchronization signaling within digital video signal 109. Synchronization processing system 200 may be integrated into a monolithic integrated circuit or hardwired using any number of discrete logic and other components. Alternatively, the controller 150 may be a dedicated processor system that includes a microcontroller or a microprocessor to implement the synchronization processing system 200 as a software program or algorithm. We explain the synchronization processing system 200 in more detail below.

In an embodiment, the controller 150 may scale the digital video signal 109 for display by the panel 160 using a variety of techniques including pixel replication, spatial and temporal interpolation, digital signal filtering and processing, and the like. In another embodiment, the controller 150 may additionally change the resolution of the digital video signal 109, changing the frame rate and/or pixel rate encoded in the digital video signal 109. Scaling, resolution, frame, and/or pixel rate conversion, and/or color manipulation are not central to this embodiment and are not discussed in further detail.

Read-only (ROM) and random access (RAM) memories 140 and 142, respectively, are coupled to the display system controller 150 and store bitmaps, FIR filter coefficients, and the like. A person of reasonable skill in the art should recognize that the ROM and RAM memories 140 and 142, respectively, may be of any type or size depending on the application, cost, and other system constraints. A person of reasonable skill in the art should recognize that the ROM and RAM memories 140 and 142, respectively, are optional in the system 100. A person of reasonable skill in the art should recognize that the ROM and RAM memories 140 and 142, respectively, may be external or internal to the controller 150. RAM memory 142 may be a flash type memory device. Clock 144 controls timing associated with various operations of the controller 150.

Figure 3:
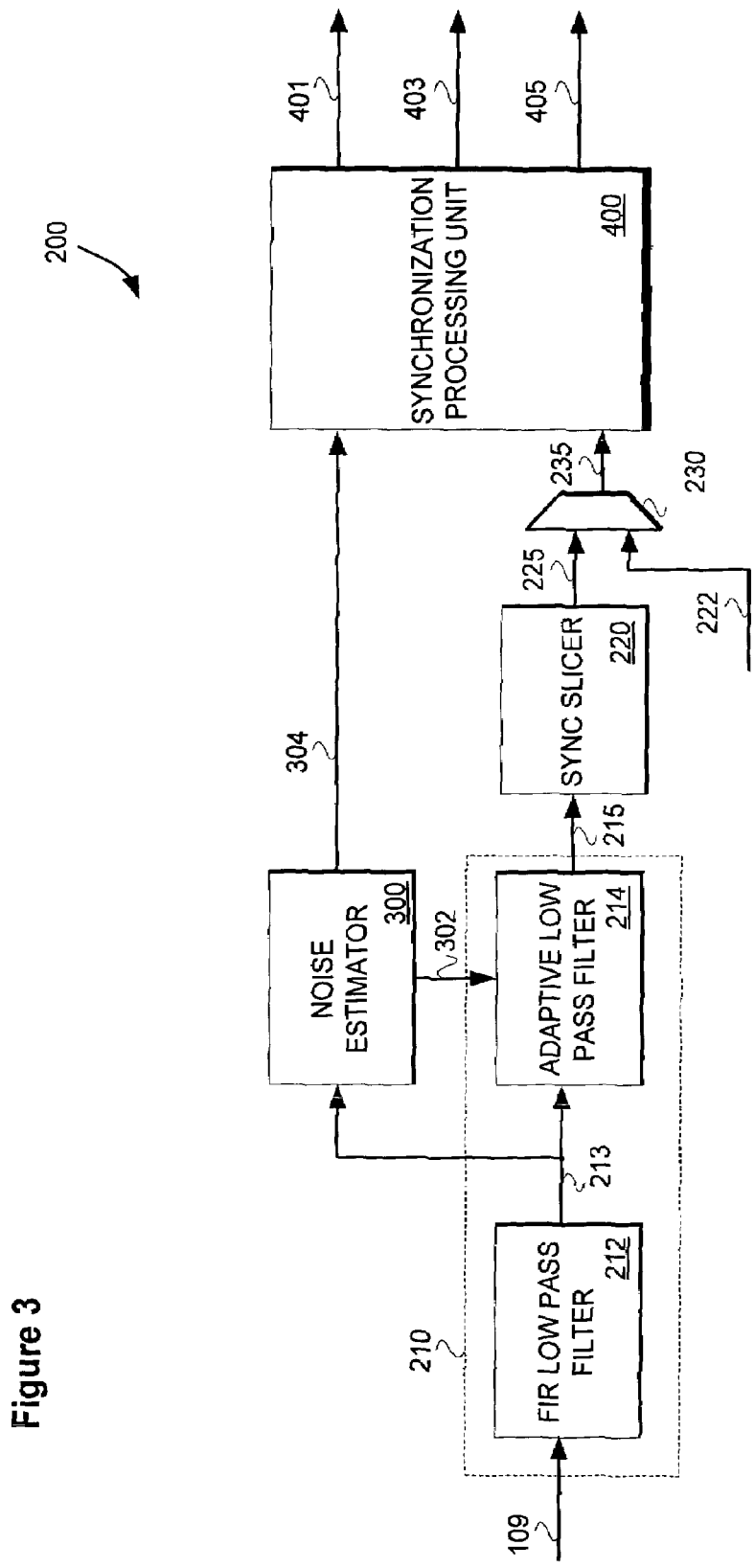
FIG. 3 is a block diagram embodiment of the synchronization processing system shown in FIG. 2.

Embodiments of the synchronization processing system 200 will be explained with reference to FIGS. 3-6. FIG. 3 is a block diagram embodiment of the synchronization processing system 200 shown in FIG. 2. Referring to FIG. 3, the synchronization processing system 200 generates synchronization signals 401, 403, and 405 responsive to synchronization signaling, or sync pulses, within digital video signal 109. The synchronization processing system 200 includes a low pass filter 210 to reject noise associated with the composite video signal 109. The low pass filter 210 provides a noise-rejected signal 215 to a sync slicer 220 for sync pulse detection.

The low pass filter 210 may include a finite-impulse-response (FIR) low pass filter 212 and an adaptive low pass filter 214. Since under-filtering the digital video signal 109 causes the sync slicer 220 to falsely detect noise as the sync pulses and over-filtering rejects the sync pulses from the digital video signal 109, the low pass filter 210 adapts its filtering of the digital video signal 109 according to the noise-level associated the digital video signal 109. The FIR low pass filter 212 filters the digital video signal 109 and provides an output signal 213 to the adaptive low pass filter 214 and a noise estimator 300. A person of reasonable skill in the art knows well the design and operation of the FIR low pass filter 212. The noise estimator 300 generates a noise estimate 302 according to the output signal 213 and provides the noise estimate 302 to the adaptive low pass filter 214. The noise estimator 300 may also generate and provide a line rejection signal 304 to a synchronization processing unit 400. Embodiments of the noise estimator 300 will be shown and described below in greater detail with reference to FIG. 4.

The adaptive low pass filter 214 filters the output signal 213 according to the noise estimate 302 from the noise estimator 300. In some embodiments, the adaptive low pass filter 214 may be an infinite-impulse-response (IIR) low pass filter with a time-constant that is adjustable according to the noise estimate 302. For instance, as the noise estimate 302 increases, the adaptive IIR filter 214 lowers its cut-off frequency to provide better noise rejection. A person of reasonable skill in the art knows well the design and operation of the IIR low pass filter 214. The adaptive low pass filter 214 provides the noise-rejected signal 215 to the sync slicer 220. As previously mentioned, over-filtering the output signal 213 also rejects the synchronization signaling, thus during increased noise conditions the adaptive low pass filter 214 may pass noise along within the noise-rejected signal 215 to avoid over-filtering.

The sync slicer 220 detects a predetermined point corresponding to the synchronization signaling embedded in the noise-rejected signal 215. This detection of a predetermined point allows output-matching of the sampling phase, thus preserving the output frequency up to the Nyquist limit. To prevent initial lock-on problems, some embodiments of the sync slicer 220 average the back porch level and the sync tip level of the noise-rejected signal 215 to capture luma values just before and after a 50% slice point. The output 225 of the sync slicer 220 may be further filtered to remove glitches, e.g., with an up/down counter (not shown), insuring rejection of the low frequency undershoots typical of, e.g., video cassette recorders (VCRs). The sync slicer 220 provides the output 225 to a switching device 230. The switching device 230 selects an output 235 from one of the output 225 of the sync slicer 220 or a signal 222 provided from a source external to the synchronization processing system 200. The external source may be another sync slicer, e.g., located within an analog-to-digital converter (ADC) core and/or provide a Sync On Green (SOG) signal or other horizontal synchronization signals to the switching device 230. The switching device 230 provides a sliced output 235 to the synchronization processing unit 400.

The synchronization processing unit 400 generates the synchronization signals 401, 403, and 405 according to sliced output 235. The controller 150 may use the synchronization signals 401, 403, and 405 to appropriately lock onto the digital video signal 109 for further processing and display. The synchronization processing unit 400 may also receive the line rejection signal 304 from the noise estimator 300 for use in generating the synchronization signals 401, 403, and 405. Embodiments of the synchronization processing unit 400 will be shown and described in greater below with reference to FIGS. 5 and 6.

Figure 4:
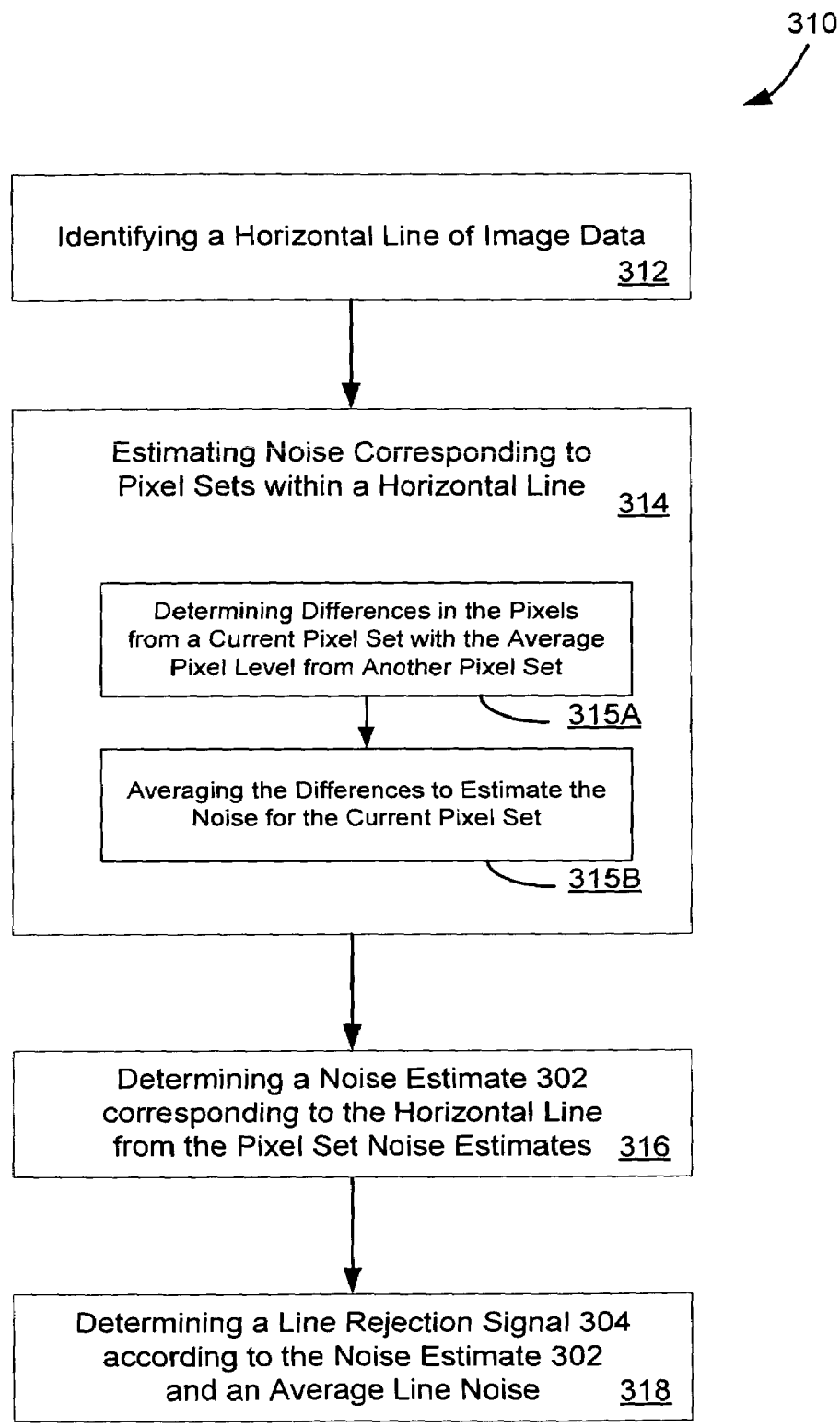
FIG. 4 is a flow chart diagram illustrating embodiments of the noise estimator shown in FIG. 3.

FIG. 4 is an example flow chart 310 illustrating embodiments of the noise estimator 300 shown in FIG. 3. Referring to FIG. 4, at a block 312, the noise estimator 300 identifies a line of horizontal image data within output signal 213. This identification may be performed responsive to the output signal 213 or a received signal, e.g., horizontal synchronization signal 401 or other control signal. In some embodiments, the noise estimator 300 identifies the horizontal image data without locking to the sync pulses within digital video signal 109.

At block 314, the noise estimator 300 estimates the noise corresponding to pixel sets within the horizontal line of image data. Each pixel set may correspond to two cycles of the color sub-carrier frequency, or approximately 16 pixels within a horizontal line of image data, although other pixel set sizes may be programmed. In some embodiments, the noise estimator 300 may estimate the noise associated with a current pixel set by determining the difference between an average pixel level from another pixel set and each pixel within a current pixel set (block 315A). The magnitudes of the differences may then be averaged to estimate the noise corresponding to the current pixel set (block 315B). The averaged differences for a current pixel set may additionally be averaged with the averaged differences of one or more other pixel sets to reduce potential for fluctuation between pixel set estimates. The noise estimator 300 need not perform noise estimates on all pixel sets within a horizontal line. For instance, the noise estimator 300 may require the average pixel level of a pixel set to fall within a predetermined range of values, thus allowing the exclusion of undesirable pixel sets from the line noise estimation.

At block 316, the noise estimator 300 determines a noise estimate 302 according to the pixel set noise estimates. In some embodiments, the noise estimate 302 may be the lowest estimate of pixel set noise for a horizontal line. The noise estimator 300 may also adaptively filter the noise estimate 302 prior to providing it the adaptive low pass filter 214 (FIG. 3). For example, the noise estimator 300 may provide more weight to lower noise estimates than to higher estimates in order to reduce line-to-line noise estimate 302 fluctuation.

At block 318, the noise estimator 300 determines the line rejection signal 304 according to the noise estimate 302 and an average line noise. The line rejection signal 304 may indicate that the detection of synchronization signaling for a corresponding horizontal line is particularly unreliable due to excessive noise within the digital video signal 109. In some embodiments, the line rejection signal 304 may be generated when the noise estimate 302 for a horizontal line is substantially greater than the average line noise, e.g., more than four times, where the average line noise may be an average of the noise estimate 302 over a programmable number of horizontal lines of the digital video signal 109.

Figure 5:
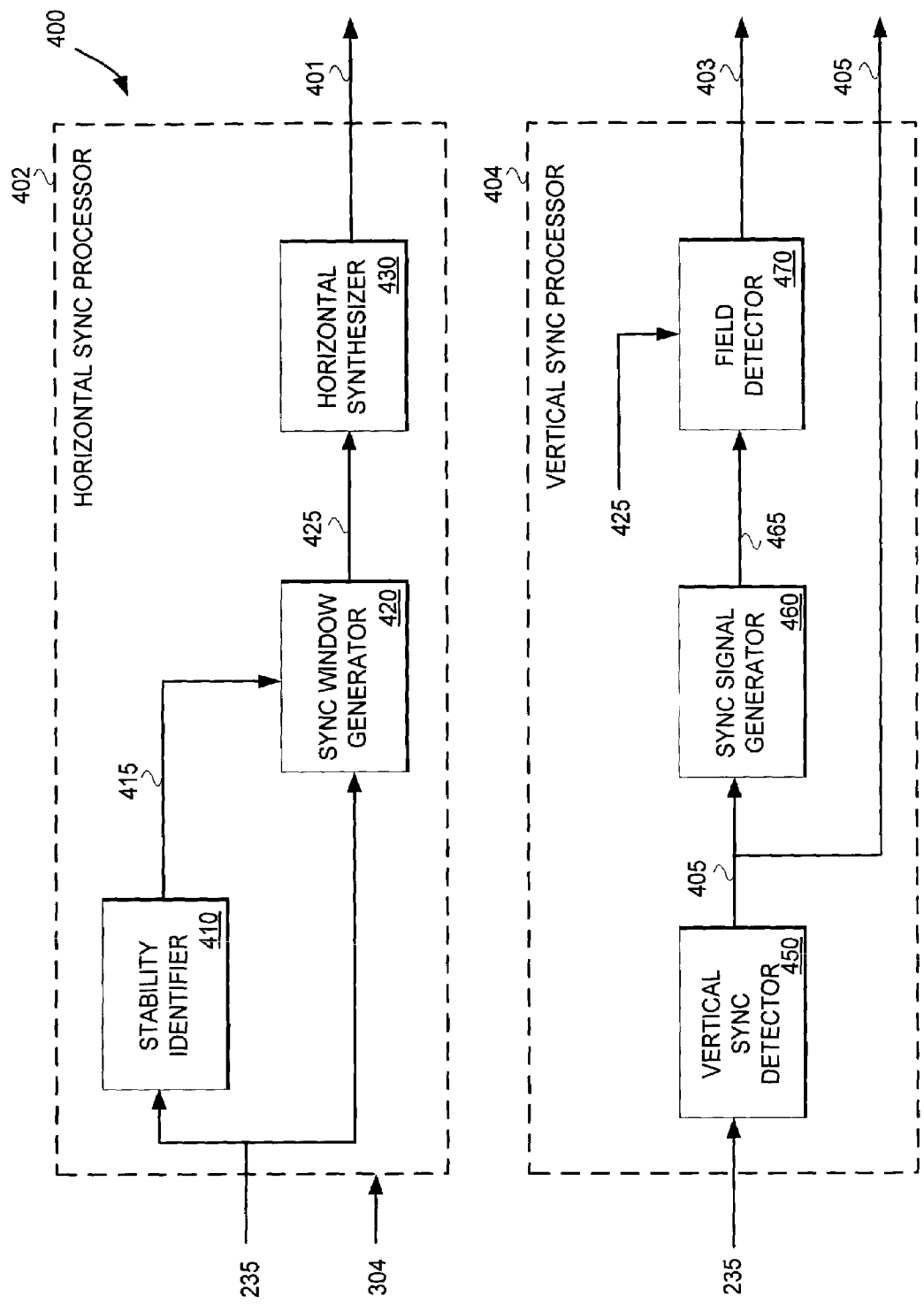
FIG. 5 is a block diagram illustrating embodiments of the synchronization processing unit shown in FIG. 3.

FIG. 5 is a block diagram illustrating embodiments of the synchronization to processing unit 400 shown in FIG. 3. Referring to FIG. 5, the synchronization processing unit 400 includes a horizontal sync processor 402 to generate a horizontal synchronization signal 401 responsive to the sliced output 235, and a vertical sync processor 404 to generate a vertical synchronization signal 405 and a detected field signal 403 responsive to the sliced output 235. Although the synchronization processing unit 400 is shown in FIG. 5 to include both the horizontal sync processor 402 and the vertical sync processor 404, each processor 402 or 404 may be included separately or provided in distinct system modules.

The horizontal sync processor 402 generates the horizontal synchronization signal 401 by adapting between multiple horizontal synchronization signal 401 locking techniques according to the stability of the digital video signal 109. For instance, when the digital video signal 109 is considered stable, the horizontal sync processor 402 rapidly realigns the horizontal synchronization signal 401 to compensate for time-based errors. When the digital video signal 109 is determined to be unstable, however, the horizontal sync processor 402 minimizes phase adjustments made to the horizontal synchronization signal 401.

The horizontal sync processor 402 includes a stability identifier 410 to estimate a relative stability of the digital video signal 109 according to the sliced output 235. The stability identifier 410 may determine the stability of the digital video signal 109 by comparing the position of each horizontal sync pulse within the sliced output 235 to an expected window. For instance, when the position of a horizontal sync pulse falls within the expected window, the stability identifier 410 identifies the horizontal sync pulse as stable. The stability identifier 410 may also identify horizontal sync pulses that fall outside of the expected window as stable by comparing their position to one or more previous horizontal sync pulses. For instance, when two consecutive horizontal sync pulses fall on the same side of the expected window, the stability identifier 410 may identify the subsequent horizontal sync pulse as stable. The expected window is preferably wide enough to accommodate most synchronization variations from video cassette recorders, although other expected window configurations may be programmed.

The horizontal sync processor 402 may aggregate these stability determinations to generate a synchronization mode 415. The horizontal sync processor 402 may include a counter (not shown) which is decremented a programmable amount by the stability identifier 410 upon identification of each stable horizontal sync pulse, and incremented a programmable amount responsive to each unstable horizontal sync pulse. The programmable amount for increments and decrements may each vary according to the synchronization mode 415, or a current counter value. The stability identifier 410 provides the synchronization mode 415 to the sync window generator 420. In some embodiments, the stability identifier 410 may provide the stability determinations directly to the sync window generator 420 for use by the sync window generator 420 in determining the synchronization mode 415. In other embodiments, the stability determinations may be the synchronization mode 415.

The synchronization mode 415 may include two settings, e.g., stable and unstable, while other embodiments may include one or more additional settings, e.g., one or more stability settings between the stable and unstable settings. In some embodiments, the synchronization mode 415 includes a continuous range of settings implemented by multiple stable/unstable fuzzy logic sets. The stability identifier 410 may set the synchronization mode 415 according to a counter value, or may provide the counter value to the sync window generator 420 directly as the synchronization mode 415. The counter may have predetermined maximum value and minimum value levels to ensure changes in the setting of the synchronization mode 415 coincide with variations in the stability of the digital video signal 109.

The sync window generator 420 generates a sync window 425 responsive to the synchronization mode 415 and provides the sync window 425 to a horizontal synthesizer 430. The horizontal synthesizer 430 generates the horizontal synchronization signal 401 responsive to the sync window 425. The horizontal synthesizer 430 may generate the horizontal synchronization signal 401 by phase adjusting a signal generating source (not shown separately from the horizontal synthesizer 430) according to the sync window 425 and the detected horizontal sync pulses. In some embodiments, the signal generating source may be a stable crystal clock source providing pulses at a frequency substantially similar to horizontal sync pulse signaling within a typical video signal. The sync window 425 may identify the maximum allowable phase adjustment that may be made to the signal generating source. For instance, when the synchronization mode 415 is set to a stable setting, the sync window 425 may be large allowing the horizontal synthesizer 430 to rapidly realign the horizontal synchronization signal 401 according to the detected horizontal sync pulse position. Conversely, when the synchronization mode 415 is set to an unstable setting, the sync window 425 may be small, thus the horizontal synthesizer 430 minimally adjusts the horizontal synchronization signal 401 according to the position of the detected horizontal sync pulse. The sync window generator 420 may dynamically vary the sync window 425 to include one or more intermediate sizes between a maximum and minimum sync window size according to the synchronization mode 415.

The horizontal sync processor 402 may also receive the line rejection signal 304 from the noise estimator 300. The line rejection signal 304 may indicate to the horizontal sync processor 402 that the presence of a detectable horizontal sync pulse within sliced output 235 is highly unlikely due to elevated noise associated with digital video signal 109. The horizontal sync processor 402 may generate the horizontal synchronization signal 401 according to one or more previous horizontal sync pulse detections or the expected location of the horizontal sync pulse responsive to the line rejection signal 304.

The horizontal sync processor 402 may generate the horizontal synchronization signal 401 from an asynchronous signal, such as SOG signals or externally sliced output 235. Since the horizontal sync 401 preserves the horizontal synchronization pulse timing of the sliced output 235, while eliminating the other pulses, i.e., equalization/serration pulses within the vertical blanking period and/or Macrovision pulses, the controller 150 may use the horizontal synchronization signal 401 to directly drive other modules within display system 100. For instance, the horizontal sync processor 402 may provide the horizontal synchronization signal 401 to a line-locked phase locked loop within an analog-to-digital converter (not shown) as a reference signal. Since the horizontal synchronization signal 401 includes only horizontal synchronization signaling, system designers may simplify the design of other modules within the display system 100, such as the line-locked phase locked loop, as they would no longer be required to ignore non-horizontal sync pulse signaling within the drive signals.

The vertical sync processor 404 generates the field detection signal 403 and the vertical synchronization signal 405 responsive to the sliced output 235. The vertical sync processor 404 includes a vertical sync detector 450 to generate the vertical synchronization signal 405 by detecting vertical sync pulses within the sliced output 235. In some embodiments, the vertical sync detector 450 may include an up/down counter (not shown separately from the vertical sync detector 450) to remove horizontal sync pulses and other pulses within digital video signal 109, e.g., equalization pulses within the vertical blanking period, prior to detecting the vertical sync pulses. The up/down counter may have a maximum count, or integration period, equal to ¼ an expected horizontal line length. The vertical sync detector 450 provides the vertical synchronization signal 405 to a sync signal generator 460.

The vertical sync detector 450 may also receive detection verification signals (not shown) from the signal processing system 200. The detection verification signals may verify to the vertical sync detector 450 that the detection of the vertical sync pulses is accurate. In some embodiments, the signal processing system 200 includes another BR filter and up/down counter (not shown), e.g., within the sync slicer 220, to directly filter the digital video signal 109 producing the detection verification signals.

The sync signal generator 460 generates and internal processing signal 465 responsive to the vertical synchronization signal 405. The internal processing signal 465 may be in-phase with the vertical synchronization signal 405, but have a pulse frequency that is substantially similar to the horizontal synchronization signaling within a typical digital video signal 109. In other words, the internal processing signal 465 may be an internally generated horizontal synchronization signal that is phase-aligned with the vertical synchronization signal 405. The sync signal generator 460 provides the internal processing signal 465 to a field detector 470. In some embodiments, the sync signal generator 460 also provides the internal processing signal 465 to the horizontal synthesizer 430 within the horizontal sync processor 402, where the horizontal synthesizer 430 may generate the horizontal synchronization signal 401 according to the internal processing signal 465. For instance, the horizontal synthesizer 430 may selectively provide the internal processing signal 465 as the horizontal synchronization signal 401 when the horizontal sync processor 402 is attempting to lock-on to the horizontal synchronization signaling of sliced output 235.

The field detector 470 generates the field detection signal 403 according to the internal processing signal 465 and the horizontal synchronization signal 401 from the horizontal sync processor 402. The field detection signal 403 may identify the polarity of interlaced fields of image data, e.g., either even or odd, according to the phase difference between the internal processing signal 465 and the horizontal synchronization signal 401.

Since the frequency of the internal processing signal 465 is substantially similar to the horizontal synchronization signaling within a typical digital video signal 109, the field detector 470 may delay the identification of the interlace field polarity until the horizontal synchronization signal 401 is stable. The field detector 470 may identify the field polarity after the horizontal synchronization signal 401 has locked-on to the digital video signal 109, thus ensuring a reasonably stable phase relationship with the internal processing signal 465. The field detector 470 may delay the identification of the field polarity until after a programmable number of horizontal signal periods, thus allowing the horizontal sync processor 402 a programmable time period after the detection of a vertical sync pulse to stabilize the horizontal synchronization signal 401.

In some embodiments, the field detector 470 may include a default setting for the field detection signal 403, e.g., set to an even field or based upon one or more previous settings, when the polarity of the field could not be determined, e.g., when the horizontal synchronization signal 401 could not lock-on to the digital video signal 109 or upon initial start-up. The field detector 470 may also be programmed to resist changing the field detection signal 403 unless a predetermine threshold of phase difference is measured between the internal processing signal 465 and the horizontal synchronization signal 401, e.g., a quarter of a horizontal line. This may be especially useful during VCR pause modes were the typical VCRs provide the same field multiple times in succession.

Figure 6:
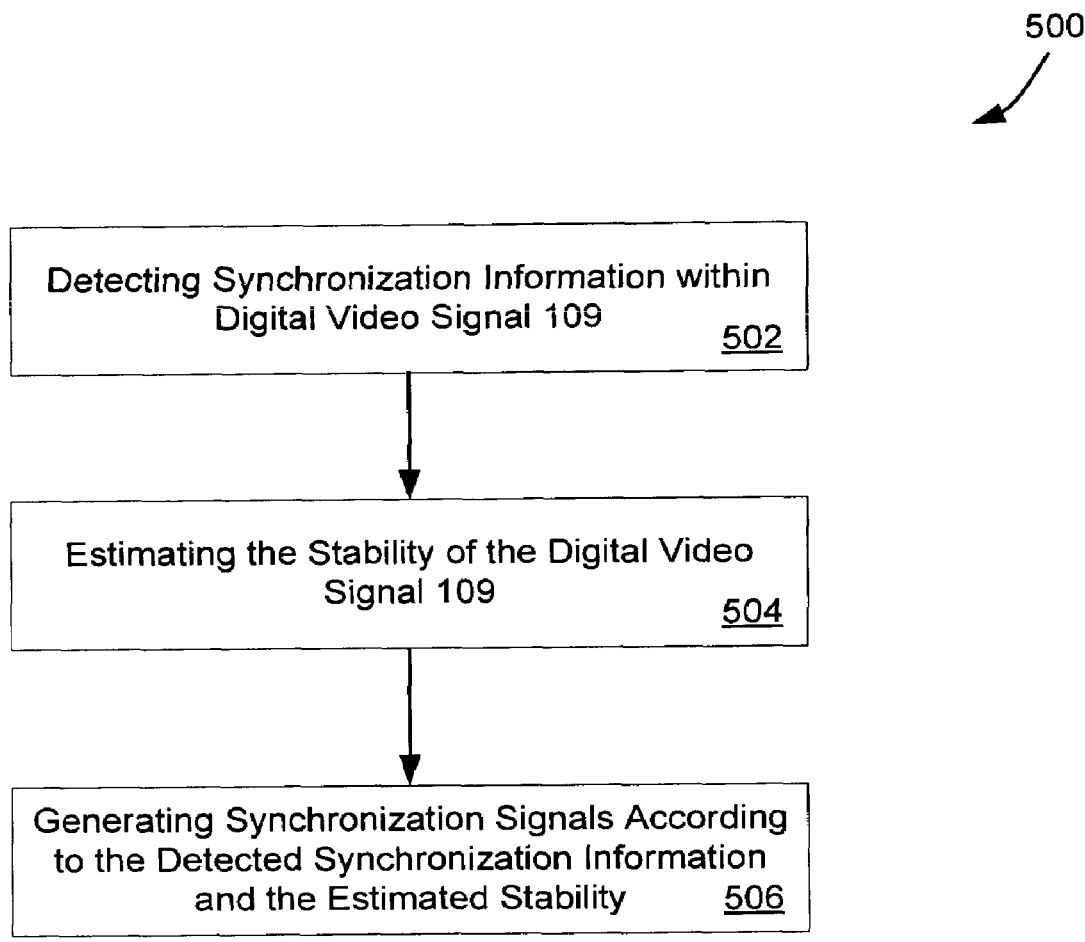
FIG. 6 is a flow chart diagram illustrating embodiments of the synchronization processing unit shown in FIG. 3.

FIG. 6 is an example flow chart 500 illustrating embodiments of the synchronization processing unit 400 shown in FIG. 3. Referring to FIG. 6, the synchronization processing unit 400 detects horizontal and/or vertical synchronization information within the digital video signal 109 (block 502), and estimates the stability of the digital video signal 109 (block 504). The stability of the digital video signal 109 may be estimated according to the detected synchronization information, and/or the noise corresponding to the video signal. The synchronization processing unit 400 generates one or more synchronization signals 401 according to the detected synchronization information and the stability of the digital video signal 109 (block 506). For instance, in block 504, when the stability of the video signal is stable, the synchronization processing unit 400 at block 506 compensates for time-based errors associated with the digital video signal 109. Conversely, in block 504, when the stability of the digital video signal 109 is unstable, the synchronization processing unit 400 at block 506 minimizes phase shifts within the synchronization signals.

Although FIGS. 2-6 show and describe the detection and processing of synchronization information within controller 150, the embodiments of the present invention are not so limited and may be incorporated within other systems. Having illustrated and described the principles of our invention, it should be readily apparent to those skilled in the art that the invention may be modified in arrangement and detail without departing from such principles. We claim all modifications coming within the spirit and scope of the accompanying claims.

We claim:

1. A method comprising:
adaptively filtering an incoming video signal to produce a noise-rejected video signal;
detecting synchronization information in the noise-rejected video signal;
estimating stability of the noise-rejected video signal responsive to the detecting; and
generating one or more synchronization signals responsive to the detecting and the estimating.

2. The method of claim 1 comprising
determining the noise-rejected video signal is stable responsive to the estimating; and
compensating for time-based errors associated with the noise rejected video signal responsive to the determining.

3. The method of claim 1 comprising
determining the noise-rejected video signal is unstable responsive to the estimating; and
generating the one or more synchronization signals with minimal phase shifting responsive to the determining.

4. The method of claim 1 includes
detecting horizontal sync pulses within the noise-rejected video signal; and
generating a horizontal synchronization signal according to the horizontal sync pulses and the estimated stability of the noise-rejected video signal.

5. The method of claim 4 includes
comparing one or more of the detected horizontal sync pulses to an expected reception window;
determining a synchronization mode to identify the stability of the noise-rejected video signal responsive to the comparing; and
generating the horizontal synchronization signal according to the detected horizontal sync pulses and the stability mode.

6. The method of claim 5 includes
aggregating a plurality of the expected reception window comparisons; and
determining the stability mode according to the aggregated comparisons.

7. The method of claim 5 where the stability mode identifies a maximum allowable phase shift in the generated horizontal synchronization signal.

8. The method of claim 1 including
detecting horizontal and vertical synchronization information within the noise-rejected video signal;
generating an internal horizontal signal responsive to the vertical synchronization information; and
detecting a polarity of one or more image fields within the noise-rejected video signal responsive to the horizontal synchronization information and the internal horizontal signal.

9. The method of claim 8 includes generating an interlaced field signal according to the detected polarity of the one or more image fields.

10. The method of claim 8 where the internal horizontal signal is substantially in-phase with the vertical synchronization information and substantially the same frequency as the horizontal synchronization information.

11. The method of claim 8 includes delaying the detecting of the polarity of image fields according to the stability of the noise-rejected video signal.

12. An apparatus including a computer-readable medium containing computer instructions that, when executed, cause a processor or multiple communicating processors to perform a method comprising:

adaptively filtering a video signal to produce a noise-rejected video signal;
detecting synchronization information in a the noise-rejected video signal;
estimating stability of the noise-rejected video signal responsive to the detecting; and
generating one or more synchronization signals responsive to the detecting and the estimating.

13. The apparatus of claim 12 comprising
determining the noise-rejected video signal is stable responsive to the estimating; and
compensating for time-based errors associated with the noise-rejected video signal responsive to the determining.

14. The apparatus of claim 12 comprising
determining the noise-rejected video signal is unstable responsive to the estimating; and
generating the one or more synchronization signals with minimal phase shifting responsive to the determining.

15. The apparatus of claim 12 includes
detecting horizontal sync pulses within the noise-rejected video signal; and
generating a horizontal synchronization signal according to the horizontal sync pulses and the estimated stability of the noise-rejected video signal.

16. The apparatus of claim 15 includes
comparing one or more of the detected horizontal sync pulses to an expected reception window;
determining a stability mode to identify the stability of the noise-rejected video signal responsive to the comparing; and
generating the horizontal synchronization signal according to the detected horizontal sync pulses and the stability mode.

17. The apparatus of claim 16 includes
aggregating a plurality of the expected reception window comparisons; and
determining the stability mode according to the aggregated comparisons.

18. The apparatus of claim 16 where the stability mode identifies a maximum allowable phase shift in the generated horizontal synchronization signal.

19. The apparatus of claim 12 including
detecting horizontal and vertical synchronization information within the noise-rejected video signal;
generating an internal horizontal signal responsive to the vertical synchronization information; and
detecting a polarity of one or more image fields within the noise-rejected video signal responsive to the horizontal synchronization information and the internal horizontal signal.

20. The apparatus of claim 19 includes generating an interlaced field signal according to the detected polarity of the one or more image fields.

21. The apparatus of claim 19 where the internal horizontal signal is substantially in-phase with the vertical synchronization information and substantially the same frequency as the horizontal synchronization information.

22. The apparatus of claim 19 includes delaying the detecting of the polarity of image fields according to the stability of the noise-rejected video signal.

23. A system comprising:
a filter to adaptively filter a video signal to produce a noise-rejected video signal,
a stability identifier to estimate stability of the noise-rejected video signal responsive to horizontal synchronization information within the noise-rejected video signal; and
a horizontal synthesizer to generate a horizontal synchronization signal according to the horizontal synchronization information and the relative stability of the noise-rejected video signal.

24. The system of claim 23 where the horizontal synthesizer generates the horizontal synchronization signal to compensate for time-based errors associated with the noise-rejected video signal when the noise-rejected video signal is stable.

25. The system of claim 23 where the horizontal synthesizer generates the horizontal synchronization signal to minimize phase shifts within the horizontal synchronization signal when the noise-rejected video signal is unstable.

26. The system of claim 23
where the stability identifier compares one or more of the horizontal synchronization information to an expected reception window, determines a stability mode responsive to the comparing; and
where the horizontal synthesizer generates the horizontal synchronization signal according to the horizontal synchronization information and the stability mode.

27. The system of claim 23 including
a window generator to generate one or more sync windows identifying maximum allowable phase shifts within the horizontal synchronization signal responsive to the stability mode; and
where the horizontal synthesizer generates the horizontal synchronization signal according to the horizontal synchronization information and the one or more sync windows.

28. A system comprising:
means for adaptively filtering a video signal to produce a noise-rejected video signal;
means for detecting synchronization information in a the noise-rejected video signal;
means for estimating stability of the noise-rejected video signal according to the detected synchronization information; and
means for generating one or more synchronization signals according to the detected synchronization information and the estimated stability of the noise-rejected video signal.

29. The system of claim 28 where the means for generating compensates for time-based errors associated with the noise-rejected video signal when the estimated stability of the video signal is stable.

30. The system of claim 28 where the means for generating generates the one or more synchronization signals with minimal phase shifting when the estimated stability of the noise-rejected video signal is unstable.

31. The system of claim 28 includes
means for detecting horizontal sync pulses within the noise-rejected video signal; and
means for generating a horizontal synchronization signal according to the horizontal sync pulses and the estimated stability of the noise-rejected video signal.

32. The system of claim 31 includes
means for comparing one or more of the detected horizontal sync pulses to an expected reception window;
means for determining a stability mode to identify the stability of the noise-rejected video signal responsive to the comparing; and means for generating the horizontal synchronization signal according to the detected horizontal sync pulses and the stability mode.

33. The system of claim 32 includes
means for aggregating a plurality of the expected reception window comparisons; and
means for determining the stability mode according to the aggregated comparisons.

34. The system of claim 32 where the stability mode identifies a maximum allowable phase shift in the generated horizontal synchronization signal.

35. The system of claim 28 including
means for detecting horizontal and vertical synchronization information within the noise-rejected video signal;
means for generating an internal horizontal signal responsive to the vertical synchronization information; and
means for detecting a polarity of one or more image fields within the noise-rejected video signal responsive to the horizontal synchronization information and the internal horizontal signal.

36. The system of claim 35 includes means for generating an interlaced field signal according to the detected polarity of the one or more image fields.

37. The system of claim 35 where the internal horizontal signal is substantially in-phase with the vertical synchronization information and substantially the same frequency as the horizontal synchronization information.

38. The system of claim 35 includes means for delaying the detecting of the polarity of image fields according to the stability of the noise-rejected video signal.

* * * * *